United States Patent
Hochstein

(10) Patent No.: US 6,614,043 B2
(45) Date of Patent: Sep. 2, 2003

(54) IMAGING RAIN SENSOR ILLUMINATION POSITIONING SYSTEM

(75) Inventor: Peter A. Hochstein, Troy, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/835,913

(22) Filed: Apr. 16, 2001

(65) Prior Publication Data

US 2002/0148987 A1 Oct. 17, 2002

(51) Int. Cl.[7] ................................................. H01J 5/16
(52) U.S. Cl. ............... 250/573; 250/227.25; 250/208.1; 318/444
(58) Field of Search ................................. 318/443, 444, 318/483, DIG. 2; 250/573, 574, 227.25, 208.1; 340/602; 15/DIG. 15; 219/203

(56) References Cited

U.S. PATENT DOCUMENTS

| | | | |
|---|---|---|---|
| 4,476,419 A | 10/1984 | Fukatsu et al. | 318/444 |
| 4,595,866 A | 6/1986 | Fukatsu et al. | 318/444 |
| 4,636,643 A | 1/1987 | Nakamura et al. | 250/338 |
| 4,676,638 A | 6/1987 | Yasuda | 356/237 |
| 5,313,072 A | 5/1994 | Vachss | 250/573 |
| 5,537,003 A | 7/1996 | Bechtel et al. | 315/82 |
| RE35,762 E * | 4/1998 | Zimmerman | 250/574 |
| 5,923,027 A | 7/1999 | Stam et al. | 250/208.1 |
| 6,084,519 A * | 7/2000 | Coulling et al. | 340/602 |
| 6,118,383 A | 9/2000 | Hegyi | 340/602 |
| 6,262,410 B1 * | 7/2001 | Stam et al. | 250/208.1 |
| 6,320,176 B1 * | 11/2001 | Schofield et al. | 250/208.1 |
| 6,376,824 B1 * | 4/2002 | Michenfelder et al. | 250/214 R |

* cited by examiner

*Primary Examiner*—Stephone B. Allen
(74) *Attorney, Agent, or Firm*—Howard & Howard

(57) ABSTRACT

A method and assembly for sensing moisture on the exterior surface of a sheet of glass (14) comprising the steps of emitting light rays from an illuminator (12) on an illuminator axis (I) intersecting the glass (14) at an illuminator angle of incidence $I_\theta$ to reflect the light rays on a reflection axis (R) at an angle ($R_\theta$) of reflection to the glass (14) and capturing on an imaging axis (C) the reflected light rays including reflections of moisture (19) on the exterior surface of the glass (14). The method is characterized by isolating the reflection of moisture (19) from the direct reflection of the illuminator (12) to prevent the capture of the direct reflection of the illuminator (12). This can be accomplished by offsetting the imaging axis (C) from the reflection axis (R), or by stopping the direct reflection of the illuminator (12) from being captured, as with a beam stop (24).

2 Claims, 2 Drawing Sheets

IMAGING RAIN SENSOR ILLUMINATION POSITIONING SYSTEM

BACKGROUND OF THE INVENTION

1. Field of the Invention

The subject invention relates to a rain sensor for detecting moisture on the windshield of a vehicle for turning on the windshield wipers, moisture taking the form of mist, water drops or film, frost, ice, snow, fog, etc.

2. Description of the Prior Art

Many imaging rain sensors detect the sharp edges of raindrops imaged onto a photodiode focal plane array, i.e., a camera. This type is described in U.S. Pat. No. 5,923,027 to Stam et al. Ambient lighting and auxiliary lighting for low light operation is generally non-critical in such edge detection sensors. Since primary image discrimination in the prior art is provided by the image contrast of raindrop edges, any light source that delivers suitable background/object contrast is generally acceptable. Of course, the selectivity and sensitivity of such edge detection methods is limited because of interfering light sources and the inability of the optics to limit sensitivity to the windshield surface. Despite attempts to defocus specular (interfering) sources, moving bright lights within the detector field of view tend to confuse the control system, causing unwanted (phantom) wiping.

The prior art which sometimes uses ancillary illumination needs only to flood the field of view with sufficient radiant energy to allow the imager to discern rain drop edges. That is, the specific geometric relationship between the radiant source, the windshield and the imager is not critical and ill defined.

The U.S. Pat. No. 5,313,072 to Vachss uses an imager array to sense the backscattered light from raindrops and does specify a geometric relationship between the light source, windshield and imager. However, as shown in the Vachss '072 patent, the illumination source would completely overwhelm the imager with direct or reflected illuminant, thereby rendering the sensor blind to the relatively weak rain drop reflection signals.

In a typical automotive installation, the interior placement of the illuminator and geometry required by the prior art would result in approximately 14% of the illuminator energy reaching the imager (on axis). At the optimal near infrared wavelength of 880 nm, typical automotive windshields only exhibit approximately 10% transmission. For a two pass, send and return path, the maximum illuminant that could be direct to the imager from a perfectly reflective object on the glass, would be about 1%. For small raindrops with a nominal diameter of 1 mm in a visual field of $10^4$ mm$^2$, the expected return (per drop) is well under $10^6$ (one-millionth) the output of the IR emitting illuminator. Resolving signals from raindrops that are five orders of magnitude less than the interfering (on axis) signal is very difficult, and is the main reason that the on-axis illumination of prior art rain sensors has not been practical.

SUMMARY OF THE INVENTION AND ADVANTAGES

The present invention avoids the problems of such direct reflection of the illuminator by the inside glass surface of the windshield. Instead of intercepting the 'on axis' illuminant as in the prior art, the invention uses one or more illuminator arrays or strips to irradiate the windshield in a topology that shields the detector (camera) from direct/reflected on axis radiation of the illuminator.

The invention provides a method and assembly for sensing moisture on the exterior surface of a sheet of glass by emitting light rays from an illuminator on an illuminator axis intersecting the glass at an illuminator angle of incidence to reflect the light rays on a reflection axis at an angle of reflection to the glass, and capturing on an imaging axis the reflected light rays including reflections of moisture on the exterior surface of the glass. The invention is characterized by isolating the reflection of moisture from the direct reflection of the illuminator to prevent the capture of the direct reflection of the illuminator.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
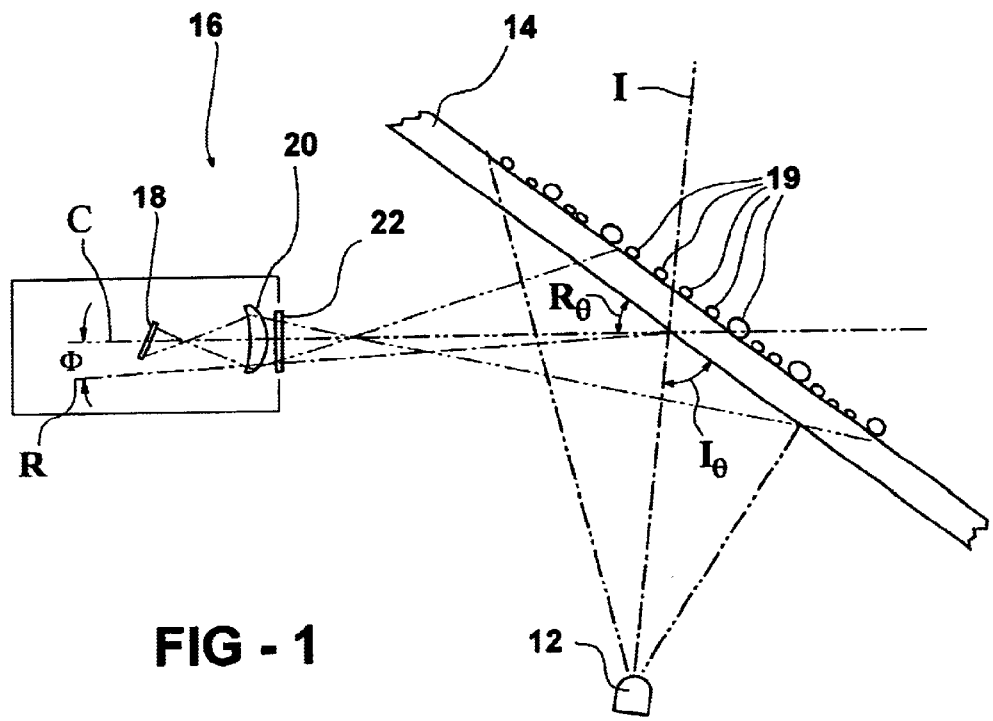
FIG. 1 is a schematic of an assembly for implementing the invention by offsetting the imaging axis from the reflection axis.
Figure 3:
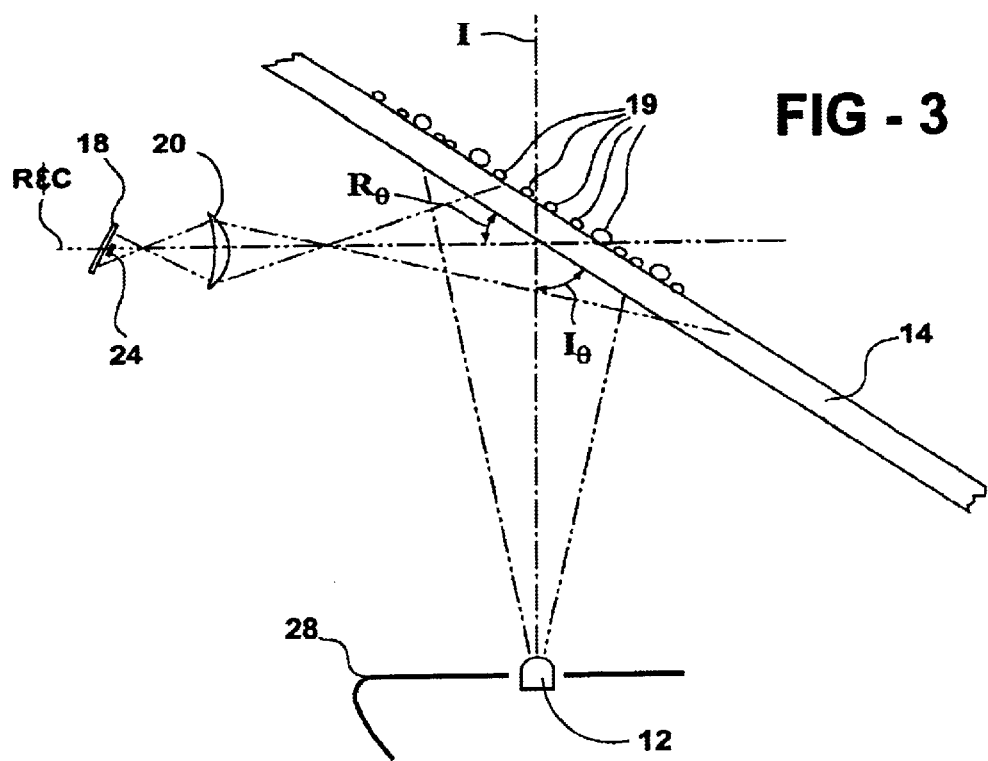
FIG. 3 is a view like FIG. 1 but showing a beam stop to implement the invention.
Figure 4:
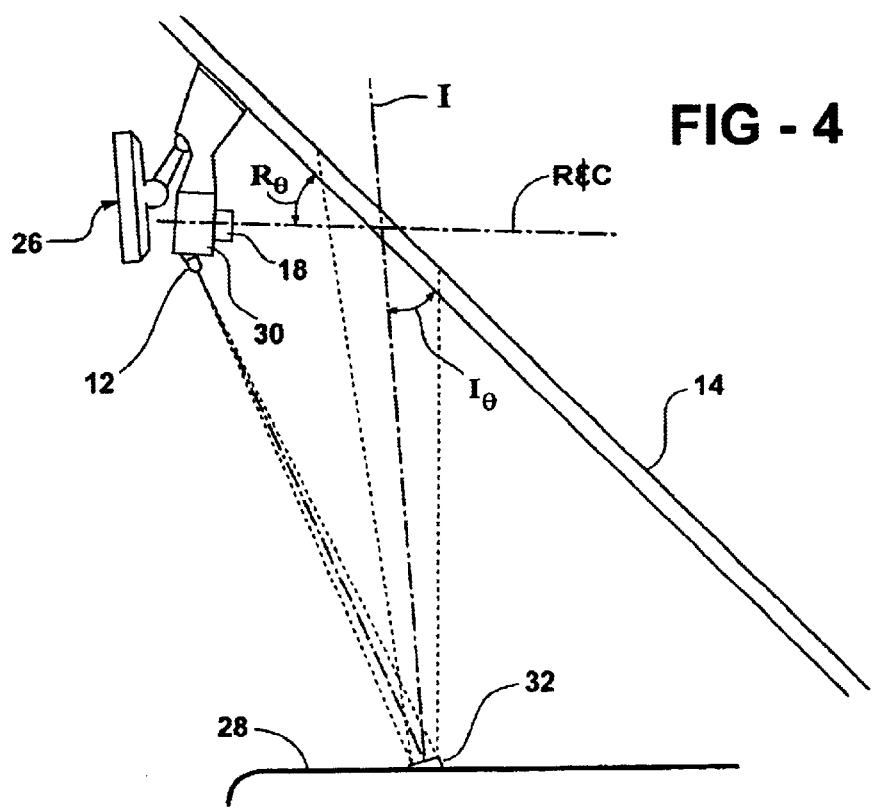
FIG. 4 is an alternative embodiment wherein the illuminator and detector are disposed in the rearview mirror housing.

Referring to the Figures, wherein like numerals indicate like or corresponding parts throughout the several views, an assembly for sensing moisture on the exterior surface of a sheet of glass from the interior is shown in each of FIGS. 1, 3 and 4.

Each assembly includes an illuminator 12 for emitting light rays on an illuminator axis I intersecting the interior surface of a glass windshield 14 at an illuminator angle of incidence $I_\theta$ to reflect the light rays on a reflection axis R at an angle of reflection $R_\theta$ to the interior surface of the glass 14. The illuminator preferably emits infrared IR light waves that are invisible to the human eye.

A detector generally shown at 16, is included on the interior side of the glass 14 for capturing on an image, i.e., camera, axis C, the reflected light rays on the interior surface including reflections of moisture (raindrops) 19 on the exterior surface of the glass 14. The detector preferably includes a focal plane array, a focusing lens 20, and a filter 22, are disposed on the interior surface side of the glass 14. The filter 22 is included for optically filtering the ambient light to the focal plane imager 18 to wavelengths in a predetermined range including the wavelength of the illuminating light rays from the light source 12.

The assembly shown in FIG. 1 is characterized by offsetting the imaging axis C from the reflection axis R an angle φ for isolating the reflection of moisture 19 from the direct reflection of the illuminator 12 to prevent the capture of the direct reflection of the illuminator 12. The illuminator in the form of an infrared emitter 12 or array of emitters is directed at the interior of the windshield 14 to illuminate a useful area on the glass with typically 880-nm radiation. As shown, the primary optical axis I of the illuminator forms an angle of incidence $I_{74}$ and is reflected by the inner glass surface of the windshield at an angle of reflection $R_\theta$. As noted earlier, placing the imager optical axis C coincident with the central axis I of the illuminator totally obscures the relatively weak reflection from the raindrops 19, which are orders of magnitude lower in luminous intensity. In fact, an essential component of the present invention is a means to prevent the illuminator 12 from being imaged on the focal plane-imaging array 18. In other words, the imaging optics and/or focal plane imager 18 that forms a real image of the specular reflections from the raindrops 19, are canted off axis at the angle $\phi$. The degree of off-axis placement $\phi$ is a function of the system topology and includes variables such as: magnification or reduction factor, field of view, imager size, placement of the illuminator 12 and imager (camera) 18 with respect to the windshield 14, and size or geometry of the radiant source 12. In general, it has been found that only small deviations $\phi$ from on-axis R operation are desirable because of the reflective nature of small raindrops 19.

Figure 2:
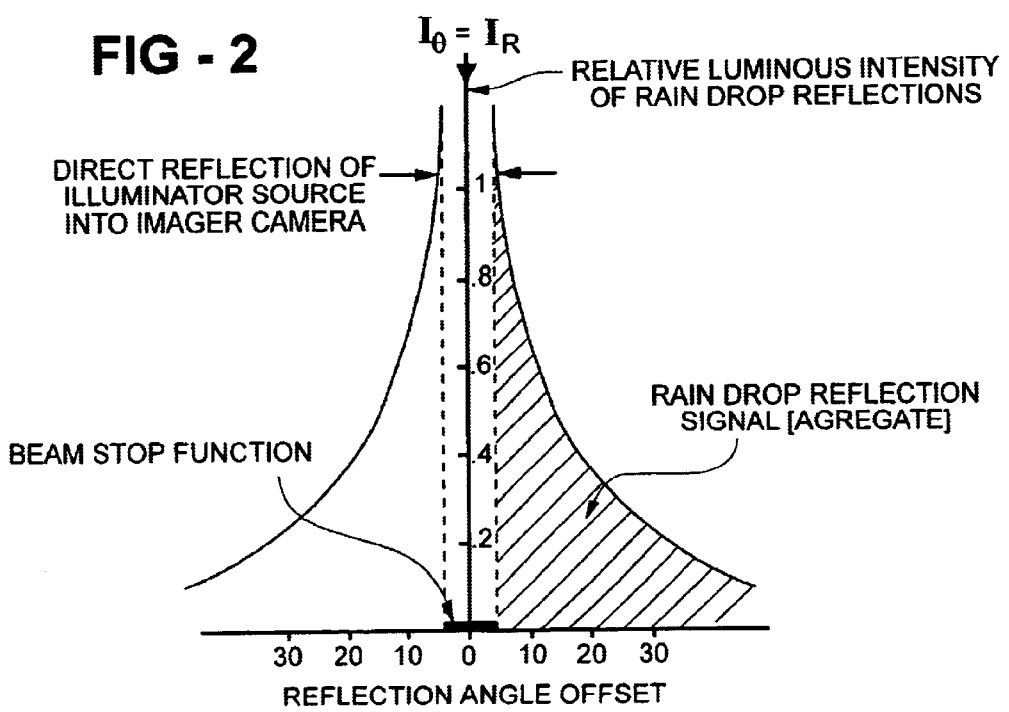
FIG. 2 is a plot of relative reflection intensities.

FIG. 2 is an experimental plot of the relative reflection intensities for an array of nominally 1-mm diameter raindrops 19 on a typical windshield 14. For reflection angles plus five degrees from optimal, where $I_\theta=R_\theta$, the aggregate reflected intensity is high, but this intensity includes the direct reflection of the illuminator 12. This intensity falls off rapidly as the detector is moved off axis, as noted. The intense, interfering direct on-axis reflection may be obscured by placing the focused image of the illuminator outside the sensitive area of the imager 18. In other words, the reflected image of the illuminator 12 is undesired (because it can saturate the focal plane array 18) and only that portion of the image that contains raindrop 19 reflections is imaged and utilized.

If a single strip array illuminator 12 is utilized, it may be directed at either the top or bottom of the image field, so that the direct reflection of the illuminator array 12 may easily be cut off. In other words, only half of the energy of the illuminator, centered about its central axis is utilized.

Alternatively, the illuminator optical axis may be centered in the field of view of the imager and a beam stop 24 used to 'blind' the sensor 18 to this intense direct reflection off the glass 14. Accordingly, the assembly shown in FIG. 3 is characterized by a beam stop 24 for isolating the reflection of moisture 19 from the direct reflection of the illuminator 12 to prevent the capture of the direct reflection of the illuminator 12 by the detector. Centering the imager axis C on the reflection axis R from the illuminator 12 and using a beam stop 24 to obscure the direct reflection permits virtually all of the energy of the illuminator 12 to be used efficiently, but the necessity for precise placement of the beam stop 24 and inherent sensitivity to vibration makes this approach difficult to implement. Sacrificing imager active area to accommodate a larger beam stop 24 is certainly possible, but resolution and/or field of view would be compromised. Image folding techniques using mirrors or prisms to eliminate the direct reflection of the illuminator off the glass are also possible. Such image partitioning would permit full illuminator utilization while maintaining imager array resolution, albeit at some penalty in cost and complexity.

The present invention, therefore, requires that the camera (imager) axis C be essentially coincident with the optical axis R of the reflected illuminator radiation, but not sensitive to such on-axis direct reflection from the illumination source 12. In practical terms, the placement of the imaging rain sensor components (focal plane array, lens, illuminator and windshield) in a car is very restricted.

Of course, the various rain sensor components may not restrict the driver's view or interfere with normal driving. In particular, the placement of the camera (imager) 18 and the illuminator 12 must be carefully executed in order to meet demands of human factors while optimizing the function and utility of the rain sensor system. The desired field of view (on the windshield 14) is relatively large and camera/lens considerations limit the possible mounting locations. One of the most convenient mounting locations is in an area behind the standard rear view mirror assembly 26, as shown in FIG. 4. While ideal from a driver's viewpoint, placing the rain sensing camera and lens behind the rear view mirror requires the IR illuminator be placed on the dashboard surface in order to preserve the pertinent angle criteria. Of course, the illuminator unit or array 12 could be placed within the dash 28, as shown in FIG. 3. A small opening or slit in the dash surface, covered with a dark IR bandpass filter would allow for an aesthetic installation. The only disadvantage of such an approach is that the rain sensing system now consists of two separate modules, interconnected by cabling. Installation of such a two-module system is obviously more complicated and less attractive to a manufacturer than a single module, unitary solution.

An alternate approach to automotive application of the present invention is shown in FIG. 4. The IR illuminator array 12, preferentially consisting of high output IR LEDs, is positioned at or in the camera [imager] housing 30. These LEDs are configured to emit energy in a relatively narrow beam, which is directed onto an IR reflector 32, (mirror) attached to the surface of the dash 28. This reflector 32 may be colored or filtered so as to minimize visible reflections of ambient light, which might be distracting to the driver or occupants.

Further, the reflector 32 may be plane surface, concave, convex or even faceted in order to optimally steer the radiant energy onto the windshield 14. The ability to customize the illuminator beam pattern by the use of such a simple reflector 32 has many advantages. A patterned reflector 32, designed to illuminate an area on the glass 14 marginally greater than the field of view of the detector camera 18 would permit the reflector 32 to be attached to the dash 28 relatively imprecisely and inexpensively, while providing good functionality. The desired angular relationships between the illuminating radiation, the windshield and the camera would be maintained and the illuminator could be mounted as an integral part of the camera housing 30, yielding a single module without interconnection cables.

Accordingly, the invention also provides an assembly for sensing moisture such as water drops, on the exterior surface of a sheet of glass 14 wherein a rearview mirror housing 26 is adapted to be attached adjacent the glass 14 in a vehicle and the illuminator 12 and the detector or imager device 18 are supported in that housing 26. Of course, such an integrated assembly would coact with a mirror 32 for reflecting the light from said illuminator 12 to the glass 14 for reflection to the detector 18. Unlike the prior art imaging rain sensors, the invention utilizes an infrared illuminator 12 and an imaging, focal plane detector 18 mounted in a defined relationship to the windshield 14, wherein the reflection of the illuminator source 12 is prevented from reaching the imager 18.

The angle of incidence $I_\theta$ of the optical axis of the illuminator 12 to the glass 14 surface is essentially equal to the angle of reflection $R_\theta$ from the windshield glass (inner surface) to the optical axis C of the imaging camera, i.e., detector 18. As noted in FIG. 1, this angular relationship may be skewed 5–10 degrees to prevent the direct reflection of the illuminator 12 into the imaging camera 18. Alternatively, a beam stop 24 may be used to obscure this direct reflection of the illuminator 12, permitting only raindrop reflections from being imaged on the focal plane array 18.

As will be appreciated, the invention provides a method for sensing moisture on the exterior surface of a sheet of glass 14 comprising the steps of emitting light rays from an illuminator 12 on an illuminator axis I intersecting the glass 14 at an illuminator angle of incidence $I_\theta$ to reflect the light rays on a reflection axis R at an angle $R_\theta$ of reflection to the glass 14 and capturing on an imaging axis C the reflected light rays including reflections of moisture 19 on the exterior surface of the glass 14. The method is characterized by isolating the reflection of moisture 19 from the direct reflection of the illuminator 12 to prevent the capture of the direct reflection of the illuminator 12. As described above, this can be accomplished by offsetting the imaging axis C from the reflection axis R. Or it is accomplished by stopping the direct reflection of the illuminator 12 from being captured, as with a beam stop 24.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A method for sensing moisture on the exterior surface of a sheet of glass (14) from the interior surface comprising the steps of;

emitting light rays from an illuminator (12) on an illuminator axis (I) intersecting the interior surface of the glass (14) at an illuminator angle of incidence to reflect the light rays on a reflection axis at an angle of reflection to the interior surface of the glass, capturing on an imaging axis (C) the reflected light rays on the interior surface including reflections of moisture on the exterior surface of the glass, said method characterized by isolating the reflection of moisture from the direct reflection of the illuminator (12) by offsetting the imaging axis (C) from the reflection axis to prevent the capture of the direct reflection of the illuminator (12).

2. An assembly for sensing moisture on the exterior surface of a sheet of glass (14) from the interior surface comprising;

an illuminator (12) for emitting light rays on an illuminator axis (I) intersecting the interior surface of the glass (14) at an illuminator angle of incidence to reflect the light rays on a reflection axis (R) at an angle of reflection ($R_\emptyset$) to the glass, a detector (18) for capturing on an imaging axis (C) the reflected light rays including reflections of moisture on the exterior surface from the interior surface to the glass, said assembly characterized by offsetting (Ø) the imaging axis (C) from the reflection axis (R) for isolating the reflection of moisture from the direct reflection of the illuminator (12) to prevent the capture of the direct reflection of the illuminator (12).

\* \* \* \* \*